Figure 1:
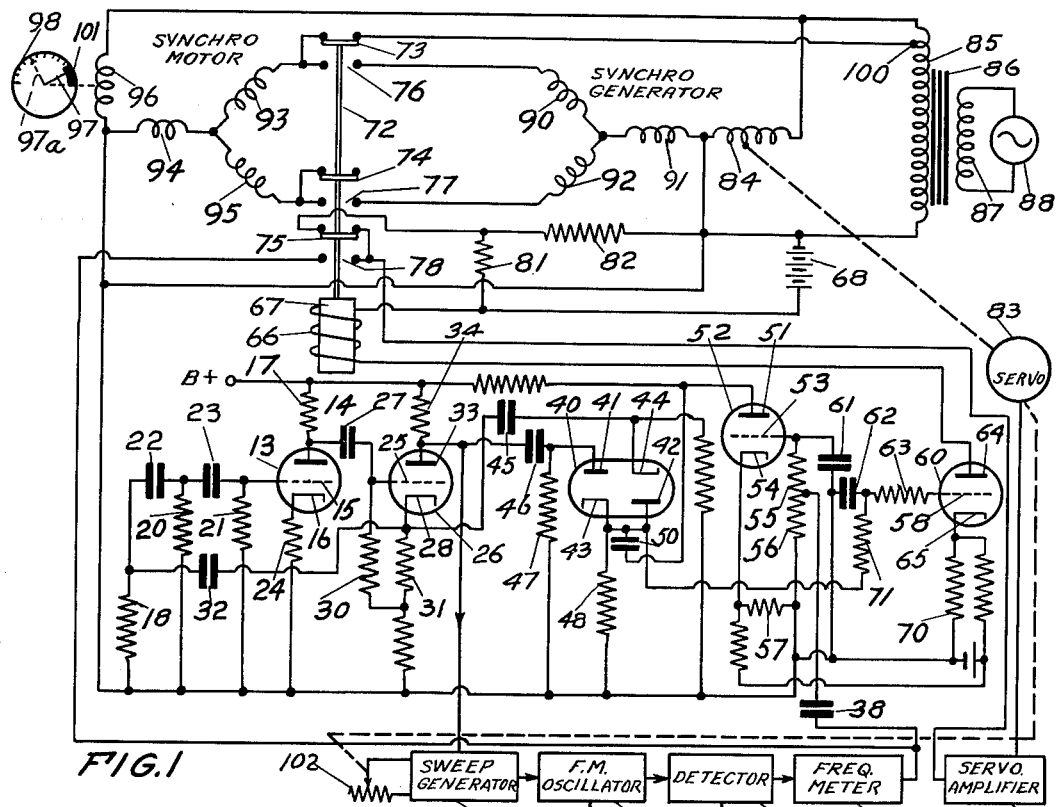

INVENTOR
FLOYD T. WIMBERLY
BY Elmer J. Gorn
ATTORNEY

United States Patent Office 2,729,814
Patented Jan. 3, 1956

2,729,814

RELIABILITY INDICATORS

Floyd T. Wimberly, Watertown, Mass., assignor to Raytheon Manufacturing Company, Newton, Mass., a corporation of Delaware Application August 15, 1952, Serial No. 304,580

9 Claims. (Cl. 343—7)

This invention relates to indicating devices, and more particularly to means in such devices for indicating when the reading is unreliable.

In many applications for measuring a particular received signal, it is desirable to have an indication only when the received signal is the desired one. One means for doing this is to impose some identifying characteristic on the transmitted signal and add means to the receiver to recover this characteristic if present and in response to it disable the indicator and arbitrarily position it where it cannot give a false indication of the quantity to be measured.

Such a system is particularly useful in echo-ranging systems such as, for example, altimeters of the frequency-modulated type wherein echo signals are received from the ground in response to the impingement of transmitting signals thereon. In such systems, it is often difficult to distinguish true echo signals from spurious signals due, for example, to bursts of background noise or signals from other sources. This is particularly true where identification of the echo signals must be done by circuitry, in order that the echo signals may be used to control a load, such as an indicating meter. Since a false altimeter reading can be disastrous, particularly when said reading is being used for a basis of the navigation of an aircraft, it is of the utmost importance that the operator of an aircraft know whether the reading appearing on the indicating meter of an altimeter represents a true altitude or whether it is merely indicative of a spurious signal and represents a false altitude reading. It is often more desirable for the operator to be able to read the meter only when the signal is reliable. When this is so he can be secure that, whenever he sees the pointer of the meter, the indicated altitude is reliable.

This invention discloses a system in which the pointer of the indicator is hidden except when the signal is reliable. Briefly, in the case of an altimeter, this is accomplished by providing a signal when the signal received or a modulation on the signal received by the altimeter is too weak, relative to the noise present in the system, to provide a reliable indication. This warning signal is utilized to disconnect the meter from the source of signal, and to substitute a fixed signal that causes the meter to move off scale preferably to a position behind a shield where the pilot cannot see it and attempt to follow any erroneous indications it might give. In one embodiment of the invention, the transmitted signal is frequency modulated in a linear fashion with a triangular wave form which is, in turn, modulated by a sinusoidal wave form of a low constant frequency. Echo signals reflected from the ground contain the same modulation components as the transmitted wave and, hence, when the echo signals are demodulated at the transmitter, for example, by beating against the transmitted signal, the result will be a beat frequency indicative of the altitude, said beat frequency varying in frequency at the frequency of the identifying signal. This beat frequency is fed to a frequency meter which may be a discriminator or counter which has an output having a D. C. component proportional to the average beat frequency representative of the altitude, and an A. C. component proportional to the identifying wave form. This A. C. component is a modulation component present only on a reflected signal, and therefore exists only as a part of a true altitude signal. The D. C. component is used to energize the indicator or other device. The A. C. component is separated out by suitable filters and fed to a phase comparator which compares its phase with that of the original identifying modulating signal. A proper phase relationship will cause the output of the phase comparator to be sufficient to operate a switching device, such as a relay having contacts that serve to disconnect the indicating device from the frequency meter and connect it instead to a source of fixed potential. This has the effect of rotating the indicator pointer from wherever it may be to a predetermined position, preferably behind a shield, so that the pilot will not see it and obtain a false indication of altitude. In operation, this form of reliability indication has been found most desirable at heights in excess of two hundred feet above ground where signal-to-noise ratios are likely to be low.

At heights below two hundred feet where signal-to-noise ratios are likely to be high except under conditions where the altitude indication is unreliable, a second embodiment of the invention has been found better. In this embodiment, a portion of the output of the detector is rectified and applied to the switching device, where, as in the first embodiment, the indicating device is switched from the output of the frequency meter to a fixed voltage to again swing the pointer off scale and out of sight to prevent the pilot from obtaining a false indication of altitude.

The system of this invention constitutes an improvement over the system disclosed in the copending application of Daniel Blitz, Serial No. 246,249, filed September 12, 1951, now Patent No. 2,714,206, issue July 26, 1955, in that it eliminates the possibility of the pilot overlooking a signal, such as a light, indicating that the meter indication in unreliable.

Figure 2:
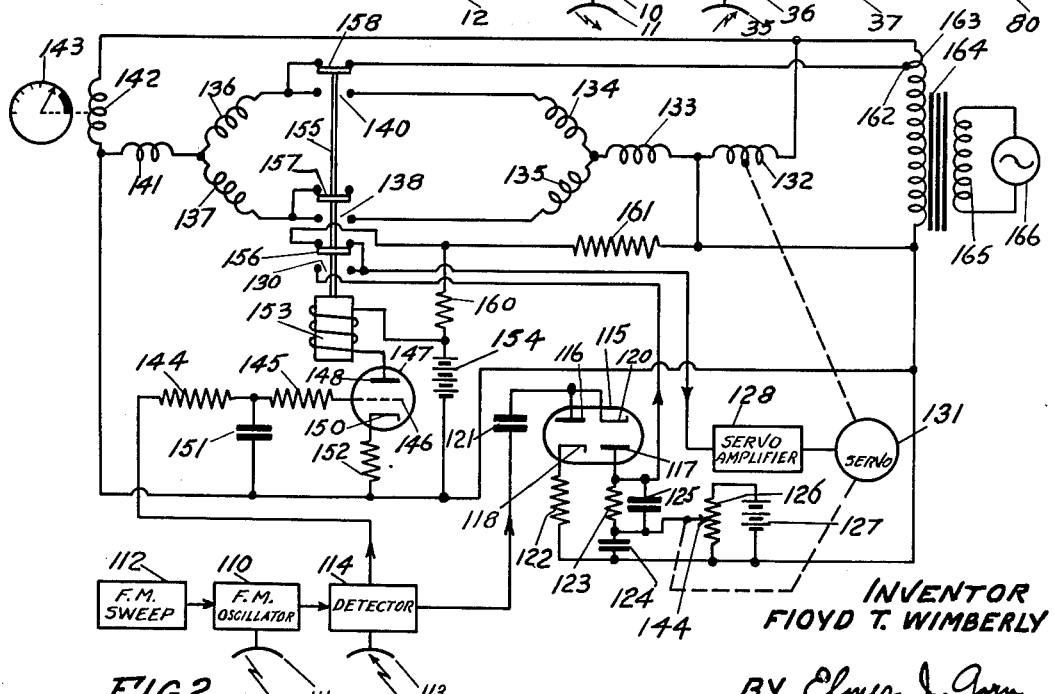

Other and further advantages of this invention will be apparent as the description thereof progresses, reference being had to the accompanying drawings, wherein:

Fig. 1 is a schematic diagram of an altimeter system incorporating one embodiment of the invention; and Fig. 2 is a schematic diagram of an altimeter system incorporating a second embodiment of the invention.

In Fig. 1, the numeral 10 refers to an oscillator incorporating a magnetron or other source of microwave energy to be propagated by a transmitting antenna 11. The frequency of the energy generated by the oscillator 10, which may be, for example, on the order of 100 megacycles, is varied with respect to time in a manner determined by a sweep generator 12 that produces a wave of triangular form.

This triangular wave form is modulated by a sine wave of lower frequency, such as ten cycles per second produced by a generator comprising a vacuum tube 13. This vacuum tube 13 has a plate 14, a control grid 15, and a cathode 16. The plate 14 is connected to a source of positive potential through a resistor 17. The grid 15 is connected to the cathode 16 through a resistance capacitor network comprising the resistors 18, 20, and 21, and the capacitors 22 and 23, and through a cathode resistor 24. The output of this oscillator is taken from the plate 14 and coupled to the grid 25 of a tube 26 that serves as a phase splitter through a capacitor 27. The grid 25 is connected to the cathode 28 of the tube 26 through resistors 30 and 31. The cathode 28 of the tube 26 is also coupled to the grid 15 of the tube 13 through capacitors 32, 22, and 23. The plate 33 of the tube 26 is connected to a source of positive potential through a resistor 34. The output of the oscillator is coupled to the sweep generator 12 from the plate 33 of the tube 26.

The low frequency oscillator associated with the tube 13 serves to modulate the triangular wave form of the sweep generator 12 which, in turn, frequency modulates the oscillator 10, which emits a signal from the antenna 11. This signal, after reflection from some surface, such as the ground beneath the plane, returns to the antenna 35 associated with the detector 36 where this reflected signal is beaten against a portion of the output of the frequency-modulated oscillator 10 to produce a frequency-modulated signal of a different frequency than the received signal. This signal is fed to a frequency meter, such as a frequency meter 37, of any of the well-known types. The output of this frequency meter comprises a direct current component proportional to the difference between the frequency of the oscillator 10 at the time the signal was emitted from the antenna 10 and when it was received by the antenna 35, and an alternating current component that represents the low frequency modulation provided by the low frequency oscillator associated with the tube 13. This A. C. component is separated from the D. C. component by the capacitor 38 and applied to a phase comparison circuit.

The output of the low frequency oscillator is also coupled to this phase comparator circuit that is associated with a dual diode 40 comprising a pair of plates 41 and 42, and a pair of cathodes 43 and 44. The cathode 28 of the tube 26 is coupled to the cathode 44 of the dual diode 40 through a capacitor 45, and the plate 33 of the tube 26 is coupled to the plate 41 through a capacitor 46. The plate 41 is connected to the cathode 43 through resistors 47 and 48. The pltae 42 and cathode 43 are connected together and coupled through a capacitor 50 to the plate 51 of the triode 52. The grid 53 of the triode 52 is connected to its associated cathode 54 through the resistors 47 and 48. The plate 42 and cathode 43 are grid 58 of a tube 60 through capacitors 61 and 62 and resistor 63. The plate 64 of the tube 60 is connected to its cathode 65 through the coil 66 of a solenoid 67 through a source 68 of positive potential and a resistor 70.

The output of the frequency counter 37 is applied to the junction between the resistors 55 and 56 and appears at the grid 53 of the tube 52, and after amplification by this tube is coupled through capacitor 50 to the plate 42 and cathode 43 of the dual diode 40. If this signal coincides in phase and frequency with the low frequency signal applied to this dual diode by the low frequency oscillator associated with tube 13, a signal will be coupled through resistors 71 and 63 to the grid 58 of the tube 60 to increase the flow of current through the coil 66 of the relay 67 to pull down its operator 72.

This operator 72 operates normally closed contacts 73, 74, and 75, and normally open contacts 76, 77, and 78 which control the servo system that drives the indicator. The contacts 75 and 78 transfer the input to the servo amplifier 80 from the output of the frequency counter 37 to the voltage appearing at the point of connection of two resistors 81 and 82 connected across the source of positive potential 68 to form a voltage divider. The output of the servo amplifier 80 is connected to a servo motor 83 which is mechanically connected to the rotor 84 of a synchro generator. The rotor 84 is electrically connected across the secondary 85 of a transformer 86, the primary 87 of which is connected across a source 88 of fixed frequency and voltage. The stator of the synchro generator has three windings, 90, 91, and 92, with one end of each connected to a common point. The other end of winding 90 is connected over normally open contact 76 to the stator winding 93 of a synchro motor. This synchro motor has two other windings, 94 and 95. These other windings have one end of each connected to the other end of winding 93. The rotor winding 96 of the synchro motor is also connected across primary 85 of the transformer 86. This rotor 96 is mechanically connected to the pointer 97 of the indicator 98. The other end of the winding 95 is connected over normally open contact 77 to the other end of the stator winding 92 of the synchro generator. Normally closed contact 73 connects the stator winding 93 of the synchro motor to a tap 100 on the primary 85 of the transformer 86.

Thus, it can be seen that, in the absence of a reliable signal, the servo motor 83 will search for a true altitude signal by continuously turning in a predetermined direction due to the fixed potential across resistor 82 applied to the input to the servo amplifier 80 over normally closed contact 75. This will turn the rotor 84 of the synchro generator in the same direction. However, at this time there is no connection between the stator windings 90 and 92 of the synchro generator and the stator windings 93 and 95 of the synchro motor. However, at this time the potential appearing across that portion of the primary 85 of the transformer 86, between the tap 100 and the upper end of the primary 85, appears across the stator windings 93 and 94 and the rotor winding 96 of the synchro motor through normally closed contact 73. This serves to position the pointer 97 of the indicator 98 at a predetermined fixed position, which may be behind a shield 101. It will be noted that at this time the connection between the frequency meter 37 and the servo amplifier over the normally open contact 78 is broken so that no voltage indicative of altitude will appear at the input to the servo amplifier 80.

Upon the appearance of a reliable signal, that is, one having an A. C. component of the same frequency and phase as the output of the low frequency oscillator associated with tube 13, a voltage will be obtained at the grid 58 of the tube 60 which will permit sufficient current to flow through the coil 66 of the solenoid 67 to cause the operator 72 to open the normally closed contacts 73, 74, and 75, and close the normally open contacts 76, 77, and 78. This completes the circuit between the frequency meter 37 and the servo amplifier 80 over normally open contact 78 and also removes the potential across the resistor 82 from the input to the servo amplifier 80. This also completes a circuit between the stator windings 90 and 92 of the synchro generator and stator windings 93 and 95 of the synchro motor over normally open contacts 76 and 77, and removes the fixed potential between the tap 100 and the end of the primary winding 85 of the transformer 86 from across the stator windings 93, 94 and the rotor windings 96 of the synchro motor. Under these conditions, the servo 83 will receive a voltage from the servo amplifier 80 proportional to the altitude to be measured. This will position the servo 83 at a position indicative of this altitude which, in turn, will position the rotor 84 of the synchro generator in a similar position, producing a voltage in the rotor windings 90, 91, and 92 that, after being transmitted to the stator windings 93, 94, and 95 of the synchro motor over normally open contacts 76 and 77, will cause the rotor 96 to assume a position indicative of the altitude and carry with it the pointer 97 of the indicator 98. The pointer will then come from behind the shield 101 and assume a position indicated by the dotted arrow 97a indicating the altitude of the plane. The servo motor 83 also controls a potentiometer 102 in the sweep generator 12 for the purpose of changing the amplitude of the sweep with altitude, and thus balancing the servo loop. This part of the circuit has little to do with the operation of the present invention and is mentioned here only to complete the description.

Fig. 2 shows an embodiment of the invention particularly useful at lower altitudes. The reference numeral 110 refers to an oscillator incorporating a magnetron or other source of microwave energy to be propagated by a transmitting antenna 111. The frequency of the energy generated by the oscillator 110, which may be of the same order as the embodiment shown in Fig. 1, is varied with respect to time in a manner determined by a sweep generator 112 that produces a wave of triangular form.

The frequency-modulated output of the oscillator 110, after being reflected from some surface such as the ground beneath the plane, returns to an antenna 113 associated with a detector 114 which may be similar in design to that used in the embodiment shown in Fig. 2 where this reflected signal is beaten against a portion of the output of the oscillator 110 to produce a frequency-modulated signal of a different frequency from the received signal. This signal is fed to a frequency meter of any of the well-known types. The particular frequency meter shown in Fig. 2 comprises a dual diode 115 having a pair of plates 116 and 117, and a pair of cathodes 118 and 120. The output of the detector 114 is coupled to the plate 116 and the cathode 120 through a capacitor 121. The cathode 118 is coupled to the plate 117 through resistors 122 and 123, and a capacitor 124. The resistor 123 is shunted by a capacitor 125. Voltage from a potentiometer 126 connected across a source of potential 127 is applied across the capacitor 124. The output of the counter in the form of a direct current voltage is taken from the plate 117 of the dual diode 115 and applied to a servo amplifier 128 over a normally open set of contacts 130. The output of the servo amplifier 128 drives a servomotor 131. The servomotor 131 drives the rotor 132 of a servo generator comprising stator windings 133, 134, and 135. The windings 134 and 135 are connected to stator windings 136 and 137 of a second servomotor over normally open contacts 138 and 140. This second servomotor has a third stator winding 141 and a rotor 142 which drives an altitude indicator 143 which is similar in construction to that shown in Fig. 1. The servomotor 131 also drives the arm 144 of the potentiometer 126 in such a manner as to apply an opposing voltage to the output of the frequency counter which tends to cause the output of the frequency counter to be zero when the indicator 143 indicates the correct altitude.

As pointed out above, in these relatively low altitudes the signal-to-noise ratio in the detector 114 tends to be high with a reliable signal so that a reduction in this ratio below a predetermined point may be taken as a warning of an unreliable indication on the altimeter indicator. This fact is utilized in this embodiment of the invention by rectifying a portion of the output of the detector 114, and applying it through resistors 144 and 145 to the grid 146 of a tube 147, having a plate 148 and a cathode 150. The grid 146 of the tube 147 is connected to the cathode 150 through the resistor 145, a capacitor 151, and a resistor 152. The plate 148 is connected to the cathode 150 through the coil 152 of a relay 153, a source of positive potential 154, and the resistor 152. The relay 153 controls an operator 155 which, in turn, operates normally open contacts 130, 138, and 140, and normally closed contacts 156, 157, and 158. As previously pointed out, the normally open contact 130 connects the output of the counter tube 115 to the input of the servo amplifier 128. The normally closed contact 156 applies a positive potential obtained from a voltage divider comprising resistors 160 and 161 connected across the source of positive potential 154 to the input to the servo amplifier 128. As indicated above, the normally open contacts 138 and 140 complete the circuit between the stator windings 134 and 135 of the servo generator and the stator windings 136 and 137 of the second servomotor. When these contacts are broken, normally closed contact 158 connects the stator winding 136 to a tap 162 on the primary 163 of the transformer 164, the secondary 165 of which is connected to a generator 166 of alternating current.

In operation, when the portion of the output of the detector 114 applied to the grid 146 of the tube 147 is insufficient to cause enough current to flow through the coil 152 of the relay 153 to operate the relay, the servo amplifier 128 will be disconnected from the output of the counter 115, and a positive potential from across the resistor 161 will be applied to the input of the servo amplifier causing the servomotor 131 to assume a continuous rotation. At the same time the stator windings 136, 137, and 141 of the second servomotor are disconnected from the stator windings 133, 134, and 135 of the servo generator and instead stator windings 136 and 141, and rotor winding 142, are connected across a portion of the primary 163 of a transformer 164 between the tap 162 and the upper end of the primary causing the indicator 143 to assume a predetermined position which, as above, may place the indicator needle behind a shield, so that the pilot of the plane cannot receive a false indication of altitude.

While the invention has been described as used in an altimeter system with servomotors and generators, it is to be understood that the invention can be used with any type of meter that measures some characteristic of a received signal. The invention could be used with types of drives for the indicators other than the servomotors and generators shown.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a distance measuring system, a radio transmitter, means for cyclically frequency modulating said transmitter at a certain rate to produce a frequency-modulated wave, means for transmitting said frequency-modulated wave to a wave-reflecting surface, means for receiving the reflected wave, means for mixing the received wave with a portion of the modulated wave transmitted directly from the transmitter to produce a beat frequency signal, means to derive a signal from said beat frequency signal, a switching device, means under control of said derived signal to control said switching device, an indicator, means to drive said indicator comprising a first multiphase motor, two alternative driving voltage sources for said motor, a first source being a multiphase generator, means to connect said generator to said first motor comprising normally open contacts on the switching device, a second multiphase motor, means causing said second motor to drive said generator to a position determined by the distance measured, the second source being a fixed voltage, means to connect said voltage source to the first motor comprising normally closed contacts controlled by said switching device so that the first motor is in a position indicative of the distance to be measured only when the signal derived from the beat frequency signal is sufficiently strong to operate the switching device.

2. In a distance measuring system, a radio transmitter, means for cyclically frequency modulating said transmitter at a certain rate to produce a frequency-modulated wave, means for simultaneously shifting the midfrequency of the frequency-modulated wave at a periodic rate that is low compared with said cyclic rate, means for transmitting said frequency modulated wave to a wave-reflecting surface, means for receiving the reflected wave, means for mixing the received wave with a portion of the modulated wave transmitted directly from the transmitter to produce a beat frequency signal, means to demodulate said beat frequency signal, means to separate out the low frequency components of the resulting signal, means to compare the frequency and phase of these low frequency components with the low frequency modulating signal to produce a voltage when the two waves correspond in frequency and phase, a switching device, means under control of said voltage to control said device, an indicator, means to drive the indicator comprising a first multiphase motor, two alternative driving voltage sources, a first source being a multiphase generator, means to connect said generator to the first motor comprising normally open contacts controlled by the switching device, means comprising a second multiphase motor to drive said generator to a position determined by the distance measured and the second source being a fixed voltage, means to connect said fixed voltage to the first motor comprising normally closed contacts controlled by said switching device so that the first motor is in a position indicative of the distance to be measured only when the signal derived from the beat frequency signal is sufficiently strong to control the switching device.

3. In a distance measuring system, a radio transmitter, means for cyclically frequency modulating said transmitter at a certain rate to produce a frequency-modulated wave, means for transmitting said frequency-molulated wave to a wave-reflecting surface, means for receiving the reflected wave, means for mixing the received wave with a portion of the modulated wave transmitted directly from the transmitter to produce a beat frequency signal, means to rectify a portion of said beat frequency signal, a switching device, means under control of said rectified signal to control said device, an indicator, means to drive said indicator comprising a first multiphase motor, two alternative driving voltage sources for said motor, a first source being a multiphase generator, means to connect said generator to the first motor comprising normally open contacts controlled by the switching device, a second multiphase motor to drive said generator to a position determined by the distance measured, and the second source being a fixed voltage, means to connect said fixed voltage to the first motor comprising normally closed contacts controlled by said switching device so that the first motor is in a position indicative of the distance to be measured only when the beat frequency signal is sufficiently strong to operate the switching device.

4. In a distance measuring system, means for transmitting a radio frequency signal, means for modulating said radio frequency signal with a modulation signal, means for receiving and demodulating said radio frequency signal to produce a signal derived from said modulation signal proportional to the distance travelled by said signal, an indicator, means to drive said indicator comprising a first multi-phase motor, two alternative driving voltage sources for said motor, a first source being a multi-phase generator, means to connect said generator to said first motor comprising normally open contacts, a second multi-phase motor, means causing said second motor to drive said generator to a position determined by the distance measured, the second source being a fixed voltage, a set of normally closed contacts connecting said voltage source to the first motor, operating means for said normally open and normally closed contacts controlled by the output of said receiving and demodulating means to operate said contact operating means when the received and demodulated signal has certain characteristics.

5. In a distance measuring system, means for transmitting a radio frequency signal, means for modulating said radio frequency signal with a modulation signal of a predetermined frequency, means for receiving and demodulating said radio frequency signal to produce a signal derived from said modulation signal proportional to the distance travelled by said signal, an indicator, means to drive said indicator comprising a first multi-phase motor, two alternative driving voltage sources for said motor, a first source being a multi-phase generator, means to connect said generator to said first motor comprising normally open contacts, a second multi-phase motor, means causing said second motor to drive said generator to a position determined by the distance measured, the second source being a fixed voltage, a set of normally closed contacts connecting said voltage source to the first motor, operating means for said normally open and normally closed contacts controlled by the output of said receiving and demodulating means to operate said contact operating means when the received and demodulated signal has a certain frequency.

6. In a distance measuring system, means for transmitting a radio frequency signal, means for modulating said radio frequency signal with a modulation signal, means for receiving and demodulating said radio frequency signal to produce a signal derived from said modulation signal proportional to the distance travelled by said signal, an indicator, means to drive said indicator comprising a first multi-phase motor, two alternative driving voltage sources for said motor, a first source being a multi-phase generator, means to connect said generator to said first motor comprising normally open contacts, a second multi-phase motor, means causing said second motor to drive said generator to a position determined by the distance measured, the second source being a fixed voltage, a set of normally closed contacts connecting said voltage source to the first motor, operating means for said normally open and normally closed contacts controlled by the output of said receiving and demodulating means to operate said contact operating means when the received and demodulated signal has at least a certain amplitude.

7. In a distance measuring system, means for transmitting a radio frequency signal, means for modulating said radio frequency signal with a modulation signal, means for receiving and demodulating said radio frequency signal to produce a signal derived from said modulation signal proportional to the distance travelled by said signal, an indicator, a dial for said indicator, means for hiding a portion of said dial from view, means to drive said indicator comprising a first multi-phase motor, two alternative driving voltage sources for said motor, a first source being a multi-phase generator, means to connect said generator to said first motor comprising normally open contacts, a second multi-phase motor, means causing said second motor to drive said generator to a position determined by the distance measured, the second source being a fixed voltage of sufficient amplitude to drive said indicator to said hidden region of said dial, a set of normally closed contacts connecting said voltage source to the first motor, operating means for said normally open and normally closed contacts controlled by the output of said receiving and demodulating means to operate said contact operating means when the received and demodulated signal has certain characteristics, and otherwise to leave said indicator drive connected to said fixed voltage with the indicator hidden to indicate the absence of a reliable signal.

8. In a distance measuring system, means for transmitting a radio frequency signal, means for modulating said radio frequency signal with a modulation signal of a predetermined frequency, means for receiving and demodulating said radio frequency signal to produce a signal derived from said modulation signal proportional to the distance travelled by said signal, an indicator, a dial for said indicator, means for hiding a portion of said dial from view, means to drive said indicator comprising a first multi-phase motor, two alternative driving voltage sources for said motor, a first source being a multi-phase generator, means to connect said generator to said first motor comprising normally open contacts, a second multi-phase motor, means causing said second motor to drive said generator to a position determined by the distance measured, the second source being a fixed voltage of sufficient amplitude to drive said indicator to said hidden region of said dial, a set of normally closed contacts connecting said voltage source to the first motor, operating means for said normally open and normally closed contacts controlled by the output of said receiving and demodulating means to operate said contact operating means when the received and demodulated signal has a certain frequency, and otherwise to leave said indicator drive connected to said fixed voltage with the indicator hidden to indicate the absence of a reliable signal.

9. In a distance measuring system, means for transmitting a radio frequency signal, means for modulating said radio frequency signal with a modulation signal, means for receiving and demodulating said radio frequency signal to produce a signal derived from said modulation signal proportional to the distance travelled by said signal, an indicator, a dial for said indicator, means for hiding a portion of said dial from view, means to drive said indicator comprising a first multi-phase motor, two alternative driving voltage sources for said motor, a first source being a multi-phase generator, means to connect said generator to said first motor comprising normally open contacts, a second multi-phase motor, means causing said second motor to drive said generator to a position determined by the distance measured, the second source being a fixed voltage of sufficient amplitude to drive said indicator to said hidden region of said dial, a set of normally closed contacts connecting said voltage source to the first motor, operating means for said normally open and normally closed contacts controlled by the output of said receiving and demodulating means to operate said contact operating means when the received and demodulated signal has at least a certain amplitude, and otherwise to leave said indicator drive connected to said fixed voltage with the indicator hidden to indicate the absence of a reliable signal.

References Cited in the file of this patent

UNITED STATES PATENTS

| | | |
|---|---|---|
| 2,268,587 | Guanella | Jan. 6, 1942 |
| 2,440,609 | Keizer | Apr. 27, 1948 |
| 2,500,212 | Starr | Mar. 14, 1950 |
| 2,527,561 | Mayle | Oct. 31, 1950 |
| 2,533,898 | Robinson et al. | Dec. 12, 1950 |